(No Model.)
W. B. KELLY.
PLOW.
No. 562,618. Patented June 23, 1896.
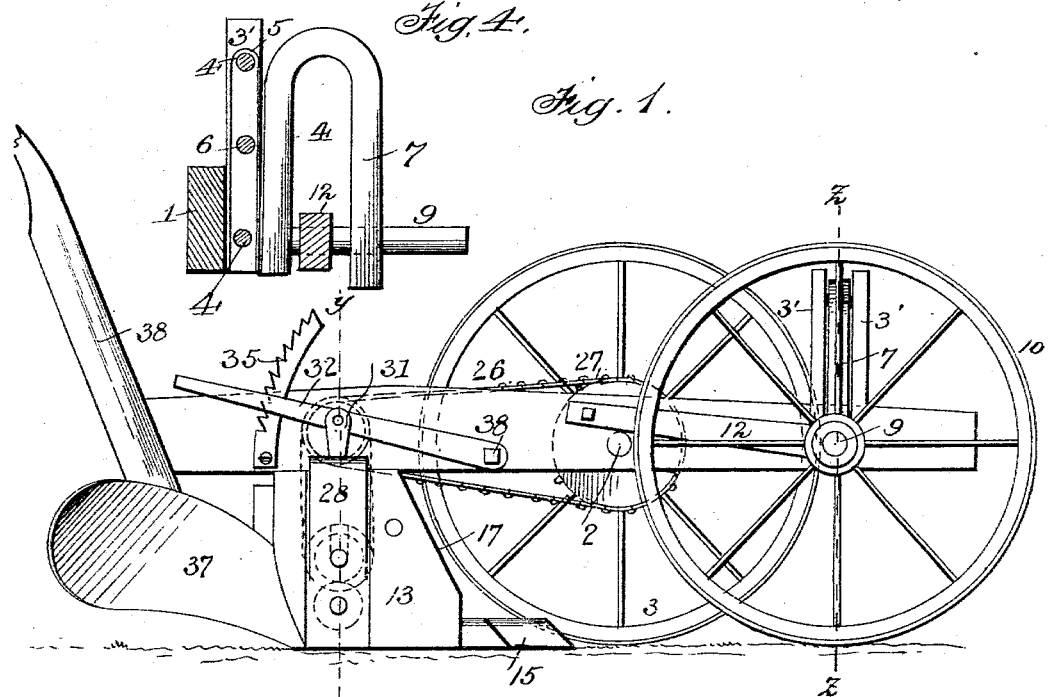
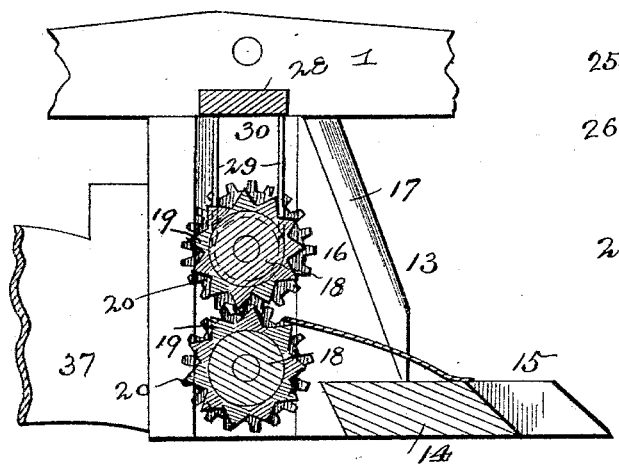
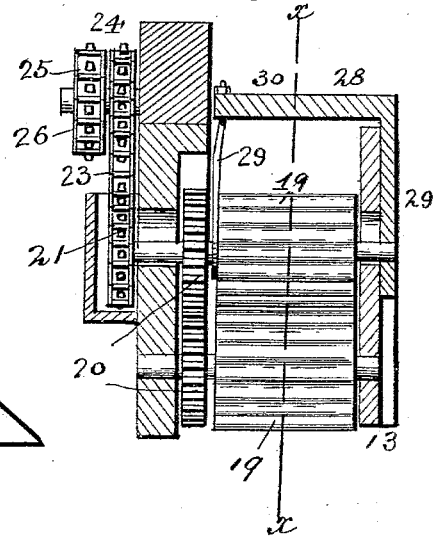
Witnesses:
F. L. Ourand
Jos. L. Coombs
Inventor:
Wm. B. Kelly,
G. Laus Bagger & Co.
Attorneys.

UNITED STATES PATENT OFFICE.

WILLIAM BUTLER KELLY, OF BARBOURSVILLE, KENTUCKY.

PLOW.

SPECIFICATION forming part of Letters Patent No. 562,618, dated June 23, 1896.

Application filed March 23, 1896. Serial No. 584,516. (No model.)

*To all whom it may concern:*

Be it known that I, WILLIAM BUTLER KELLY, a citizen of the United States, and a resident of Barboursville, in the county of Knox and State of Kentucky, have invented certain new and useful Improvements in Plows; and I do hereby declare that the following is a full, clear, and exact description of the invention, which will enable others skilled in the art to which it appertains to make and use the same, reference being had to the accompanying drawings, which form a part of this specification.

My invention relates to improvements in plows; and its object is to provide a novel construction of the same whereby the sod turned up by the share is cut and pulverized and directed into the furrow.

It also has for an object to provide improved means for elevating and lowering the share to regulate the depth of penetration thereof.

The invention consists in the novel construction and combination of parts hereinafter fully described and claimed.

In the accompanying drawings, Figure 1 is a side elevation of a plow constructed in accordance with my invention. Fig. 2 is a longitudinal sectional view on the line $x\ x$, Fig. 3. Fig. 3 is a transverse sectional view on the line $y\ y$, Fig. 1. Fig. 4 is a similar view on the line $z\ z$.

In the said drawings the reference-numeral 1 designates the plow-beam, having fixed thereto, on one side, an axle 2, to which the wheel 3 at the left of the plow is journaled. Upon the other side of the beam and in advance of said axle are secured two vertical strips 3, provided with alined or opposite holes 4. Located between these strips, which form guides therefor, is a vertically-adjustable bar 5, also provided with holes adapted to register with the holes in the guide-strips. Pins 6 pass through said holes to hold the bar in its adjusted position. This bar is secured to the inner vertical arm of a yoke 7. Both arms of said yoke at their lower ends are secured to an axle 9, to which the other wheel 10 is journaled. Pivoted to said axle, between the yoke, is a rearwardly-extending bar 12, the rear end of which is pivoted to the beam.

Near the rear of the beam, at the right thereof, is secured a frame 13, comprising the bottom 14, to the front end of which is secured a plowshare 15, and the side walls 16, having vertical cutters 17 at the front ends. Journaled in this frame, and in a vertically-movable frame hereinafter described, are two rollers 18, one above the other, provided with removable knives 19, and at their inner ends with cog-wheels 20, which intermesh with each other. The end of one of the shafts or journals of these wheels is provided with a sprocket-wheel 21, connected by chain 23 with a sprocket 24, journaled to the beam. The shaft of this latter sprocket is provided with a sprocket 25, connected by chain 26 with a sprocket 27, fixed to the axle 2.

The numeral 28 designates the vertically-movable frame, to which the upper roller is journaled, consisting of the vertical arms 29, working in recesses in the frame 13 and connected together at their upper ends by a cross-bar 30. Secured to this cross-bar is an arm 31, to which is pivoted a lever 32, the forward end of which is fulcrumed to a pin 34, secured to the standard. By operating this lever the upper roller may be moved to and from the lower roller to regulate the distance therebetween. A segment-rack 35 is secured to the beam with which the lever engages to hold it in position.

Secured to the bottom 14 of the frame 13 is a moldboard 37, which directs the pulverized soil coming from the rollers to the furrow at the right of the plow.

The numeral 38 designates the handles.

The operation is as follows: The plowshare is adjusted to cut to the required depth by raising or lowering the front end of the standard, by means of the yoke and connections, and the distance between the pulverizing-rollers is also adjusted by means of the lever and movable frame. As the plow is drawn across a field, the share will cut and turn the sod, which will be directed to the rollers by the side walls 16. As the soil passes between the rollers, it will be cut and pulverized by the knives, so as to prepare it to receive the grain, and is directed or guided by the moldboard into the furrow. The upper roller may be raised to allow rocks and trash to pass below the rollers.

Having thus fully described my invention, what I claim is—

1. In a plow, the combination with the beam, the wheels, the frame provided with a share and with side walls and the cutters secured to said walls, of the lower roller journaled to said frame, the adjustable frame, the roller journaled thereto, the knives secured to said rollers, and means for rotating said rollers; substantially as described.

2. In a plow the combination with the beam, the wheels, the frame provided with a share, the side walls provided with cutters, the roller journaled to said frame and the knives secured thereto, of the vertically-adjustable frame, the lever connected therewith, the upper roller journaled thereto, provided with knives, the cog-wheels, sprocket-wheels, and chains, the moldboard at the rear of the plow and the handles; substantially as described.

3. In a plow the combination with the beam, the rear axle, the wheel journaled thereto, the guide-bars formed with holes secured to the beam, the vertically-adjustable bar located between said guides, provided with holes, the pins passing through said holes, the yoke secured to said adjustable bar, provided with an axle, the wheel journaled thereto and the rearwardly-extending bar or arm pivoted to said axle and to the beam; substantially as described.

In testimony that I claim the foregoing as my own I have hereunto affixed my signature in presence of two witnesses.

WILLIAM BUTLER KELLY.

Witnesses:
JOSEPH SAMPSON,
HENRY BOWMAN.